United States Patent
Horikoshi et al.

(10) Patent No.: US 10,849,278 B2
(45) Date of Patent: Dec. 1, 2020

(54) PLANT CULTIVATION METHOD

(71) Applicant: SOPHIA SCHOOL CORPORATION, Tokyo (JP)

(72) Inventors: Satoshi Horikoshi, Asaka (JP); Nobuhiro Suzuki, Mitaka (JP); Yasuhiko Hasegawa, Narita (JP)

(73) Assignee: Sophia School Corporation, Tokyo (JP)

( * ) Notice: Subject to any disclaimer, the term of this patent is extended or adjusted under 35 U.S.C. 154(b) by 283 days.

(21) Appl. No.: 15/888,363

(22) Filed: Feb. 5, 2018

(65) Prior Publication Data

US 2018/0153105 A1 Jun. 7, 2018

Related U.S. Application Data

(63) Continuation-in-part of application No. PCT/JP2016/071823, filed on Jul. 26, 2016.

(30) Foreign Application Priority Data

Aug. 5, 2015 (JP) .................................. 2015-155184
Feb. 3, 2017 (JP) .................................. 2017-018206

(51) Int. Cl.
*A01G 7/04* (2006.01)
*A01G 22/60* (2018.01)

(52) U.S. Cl.
CPC ............... *A01G 7/04* (2013.01); *A01G 22/60* (2018.02)

(58) Field of Classification Search
CPC ..................................... A01G 7/04; A01G 7/00
See application file for complete search history.

(56) References Cited

U.S. PATENT DOCUMENTS

| 5,740,627 A | * | 4/1998 | Levengood | A01C 1/00 47/1.3 |
| 6,416,809 B1 | * | 7/2002 | Kang | A01G 7/04 426/634 |
| 2013/0205657 A1 | * | 8/2013 | Keller | A01G 7/00 47/57.7 |

FOREIGN PATENT DOCUMENTS

| JP | 2014-045757 A | | 3/2014 | |
| WO | WO-8702578 | * | 5/1987 | ............... A01G 7/04 |
| WO | WO-8703167 A1 | * | 6/1987 | ............. A01C 1/042 |
| WO | 2015/093509 A1 | | 6/2015 | |

OTHER PUBLICATIONS

Apr. 3, 2018 International Search Report issued in International Patent Application No. PCT/JP2018/003536.
Apr. 3, 2018 Written Opinion issued in International Patent Application No. PCT/JP2018/003536.

(Continued)

*Primary Examiner* — Monica L Barlow
*Assistant Examiner* — Aaron M Rodziwicz
(74) *Attorney, Agent, or Firm* — Oliff PLC

(57) ABSTRACT

A method for producing a plant seedling is provided, which is based on microwave radiation in order to efficiently facilitate the plant growth. In the method, microwave radiation is started at any timing during a period ranging from appearance of a first true leaf to a timing provided before appearance of a second true leaf in a growth process of a plant. The radiation time of the microwave may be within 1 hour, and the output of the microwave may be 2 to 25 W per 1 to 20 seedling or seedlings.

15 Claims, 11 Drawing Sheets

(56) References Cited

OTHER PUBLICATIONS

"Twice-Faster Plant Growth: University Laboratories Holding the Key to Agriculture for the Future: Sophia University (Part 1)". Japan Seed News Paper, vol. 2218, 2016.
Feb. 13, 2019 extended European Search Report issued in European Patent Application No. 16832842.5.
Tani, Naoki et al. "Microwave-Assisted Germination of Cucumbers Under Low-Temperature Hydroponics Environment". IEEE MTT-S International Microwave Workshop Series on Innovative Wireless Power Transmission: Technologies, Systems, and Applications, pp. 47-50, 2012.
Sep. 20, 2016 International Search Report issued in International Patent Application No. PCT/JP2016/071823.
Ryosuke Yamamoto, "Effect of Long-Term Microwave Stimulation on Growth of Plant (Spinacia oleracea)", Technical Report of IEICE, The Institute of Electronics, Information and Communication Engineers, pp. 71-75, 2016.
Satoshi Horikoshi et. al., "Microwave-induced growth acceleration in plants", Book of Abstracts 3rd Global Congress on Microwave Energy Applications (3GCMEA), Cartagena (Spain), Session A (Room 302), 2016.
Satoshi Horikoshi et al., "Growth stimulation system of plants using microwave irradiation and elucidation of its molecular mechanisms", IMPI'S 50th Annual Microwave Power Symposium, 2016.
Hideya Saitou et al., "Effects of 2.45GHz Microwave on the plant growth rate—Promotion of germination, root elongation, and synthesis of the chlorophyll-" The Institute of Electronics, Information and Communication Engineers, pp. 7-14, 2007.

* cited by examiner

COTYLEDON
(9TH DAY)

BEGINNING OF
APPEARANCE OF
TRUE LEAF (10TH DAY)

DEVELOPMENT OF
TRUE LEAF
(13TH DAY)

BEGINNING OF
APPEARANCE OF
SIX LEAVES (15TH DAY)

PLANT CULTIVATION METHOD

CROSS-REFERENCE TO RELATED APPLICATIONS

This application is a Continuation-in-part Application of International Application No. PCT/JP2016/071823 which claims the conventional priority of Japanese patent Application No. 2015-155184 filed on Aug. 5, 2015 while claiming the conventional priority of Japanese patent Application No. 2017-018206 filed on Feb. 3, 2017. The disclosures of Japanese patent Applications Nos. 2015-155184 and 2017-018206 and International Application No. PCT/JP2016/071823 are incorporated herein by reference in their entirety.

BACKGROUND

The present invention relates to a method for growing a plant to remarkably facilitate the plant growth by radiating a microwave at a specified timing in a growth process of the plant, especially a method for producing a plant seedling based on microwave radiation (microwave irradiation), and the seedling obtained thereby.

A technique is known, in which the growth of a plant is facilitated by irradiating the plant with a microwave. For example, Non-Patent Document 1 reports that when a seed of *Spinacia oleracea* was germinated while radiating a microwave, and the microwave radiation was continued even after the germination, then the remarkable development of root was confirmed. Further, Non-Patent Document 2 reports that when a seed of *Spinacia oleracea* was seeded and a microwave was continuously radiated, then the growth was facilitated in relation to the main root lengths on the 7th day and the 21st day and the fresh weight, the dry weight, and the area of leaves except for seed leaf (cotyledon) on the 35th day, as compared with those obtained without performing any radiation.

In Patent Document 1, it is confirmed that the growth of a plant is facilitated when *Raphanus sativus* L. 'Kaiware-daikon' (white radish sprouts) is irradiated with a microwave radiated from a microwave oven. However, any irradiation condition is not specifically described. Patent Document 2 discloses that the plant photosynthesis can be facilitated by means of the microwave radiation. In an embodiment thereof, it is reported that the dissolved oxygen was increased by irradiating a carbonated water sample containing *Anredera cordifolia* placed therein with a microwave in a microwave oven.

Non-Patent Document 1: Hideya SAITO et al., "Influence exerted on growth of plant by 2.45 GHz microwave", Incorporated Association of The Institute of Electronics, Information and Communication Engineers, IEICE Technical Report, SPS2006-16 (2007-2) pp. 7-14 Non-Patent Document 2: Ryosuke YAMAMOTO et al., "Influence exerted on plant growth (*Spinacia oleracea*) by long-term exposure with microwave", IEICE Technical Report, Incorporated Association of The Institute of Electronics, Information and Communication Engineers, 2012. 03, pp. 71-75

Patent Document 1: Japanese Patent Application Laid-open No. 2014-045757

Patent Document 2: WO2015/093509

SUMMARY OF THE INVENTION

Non-Patent Documents and Patent Documents described above disclose that the plant growth is facilitated by radiating the microwave onto the seeds and so on. However, in the case of the conventional techniques as described above, the radiation condition of the microwave is not investigated sufficiently. Further, the continuous microwave radiation, which is performed from the stage of the seed, is inefficient in view of the electric power as well, which is not suitable for the practical application on the commercial base. On this account, it is demanded to realize a technique for growing the plant in which the growth of the plant is much more facilitated at a higher electric power efficiency by using the microwave radiation.

An object of the present invention is to provide a novel plant growth method based on the microwave radiation in order to efficiently facilitate the plant growth.

In view of the above, the present inventors have investigated how the microwave radiation exerts the influence on the entire life of the plant, while the diligent investigations have been repeatedly made in order to find out a method which makes it possible to facilitate the growth of a plant by means of the microwave radiation in conformity with the actual plant growth environment. As a result, the present invention has been completed.

The method for cultivating the plant according to a first aspect of the present invention is a method for cultivating a plant to facilitate growth of the plant by radiating a microwave, comprising radiating the microwave onto a sprout or a seedling for not more than 120 minutes at a predetermined timing provided after a seed or a bulb of a cultivation object germinates to form the sprout.

The method for producing the plant seedling according to a second aspect of the present invention is a method for producing a plant seedling based on microwave radiation, comprising starting the microwave radiation during a period ranging from appearance of a first true leaf to a timing provided before appearance of a second true leaf in a growth process of a plant. In the production method of the invention, a radiation time of the microwave may not more than 60 minutes, and an output of the microwave may be 1 to 25 W per 1 to 20 seedling or seedlings. As for the radiation timing, the microwave may be radiated after the first true leaf develops. The plant, to which the present invention is applicable, may be a dicotyledon, especially one selected from the group consisting of *Arabidopsis thaliana, Eruca vesicaria*, and *Solanum lycopersicum*.

According to the present invention, it is possible to facilitate the growth of the plant by radiating the microwave for the predetermined time onto the sprout or the seedling at the predetermined timing provided after the seed or the bulb of the cultivation object germinates to form the sprout, particularly, during a period ranging from appearance of a first true leaf of the plant to a timing provided before appearance of a second true leaf of the plant in a growth process of a plant. Further, when the seedling is further grown, for example, until it reaches to the reproductive stage or any later stages, it is also possible to remarkably facilitate the growth thereof.

EMBODIMENTS

An explanation will be made below about a preferred embodiment of the method for cultivating the plant according to the present invention.

In this embodiment, the microwave is radiated for a predetermined time onto a germinated sprout or a seedling at a predetermined timing provided after the germination of a seed or a bulb including, for example, discoid stem, corm, tuber, rhizome, and tuberous root as a cultivation objective to form a sprout.

In general, the plant immediately after the germination from the seed is referred to as the seedling or the plant raised from the seed, which indicates such a timing or a period that the cotyledon or the first true leaf exists. However, when the cultivation object is cultivated from the seed, the following procedure is preferred. That is, the seed of the cultivation object is seeded in accordance with an ordinary method. The microwave is radiated at the timing of the seedling or the plant raised from the seed after the seeded seeds germinates to develop the cotyledon.

For example, when the cultivation object is a dicotyledon, the microwave may be radiated after the initial true leaf (first true leaf) begins to be formed from the shoot apical meristem located at the base of the cotyledon. It is also allowable to radiate the microwave at a timing at which the second true leaf is formed.

On the other hand, when the cultivation object is a monocotyledon, the microwave may be radiated after the first true leaf begins to extend from a coleoptile, it is preferable that the specified radiation start timing for the microwave is any timing provided before the beginning of the formation of the second true leaf after the timing at which the first true leaf begins to form from the coleoptile. However, in many cases, as for the monocotyledon, the leaf, which initially appears on the ground surface after the seed seeded in the ground germinates, is the first true leaf. In such a situation, the microwave may be radiated after the first true leaf appears on the ground surface.

Figure 15A:
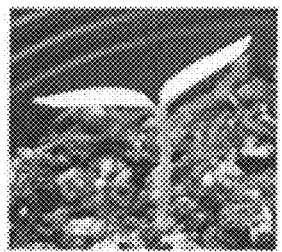
FIGS. 15A to 15D show photographs illustrating situations of fully-expanded two leaves (cotyledons), beginning of appearance of four leaves (first true leaves), development of four leaves, and beginning of appearance of six leaves of *Solanum lycopersicum* in Example 10.
Figure 15B:
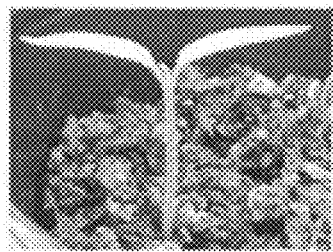
Figure 15C:
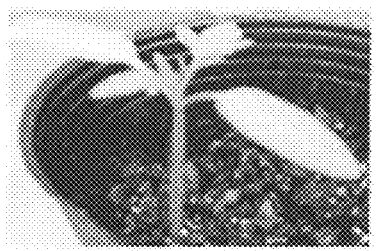
Figure 15D:

In a preferable embodiment, the microwave radiation is started at any timing (hereinafter appropriately referred to as "specified radiation start timing" in this specification) during a period ranging to a timing provided before the appearance of the second true leaf after the development of the first true leaf, from the appearance of the first true leaf after the germination of a seed or a bulb as a cultivation objective including, for example, discoid stem, corm, tuber, rhizome, and tuberous root. The phrase "from the appearance of the first true leaf" is a concept which includes not only the timing at which the first true leaf develops but also the timing at which the first true leaf begins to appear (grow). Therefore, as shown in FIG. 15B, the microwave radiation, which is performed for the first time when even a little first true leaf appears, is also included in the scope of the present invention. On the other hand, the phrase "before the appearance of the second true leaf" refers to the stage which is provided before the generation of the second true leaf is observed after the first true leaf develops. Therefore, the specified radiation start timing means any point in time provided from the point in time at which the generation of the first true leaf is observed to point in time immediately before the observation of the generation of the second true leaf. Further, in this specification, the true leaf means the leaf which appears after the cotyledon after the germination, the first true leaf means the true leaf which appears next to the cotyledon, and the second true leaf means the true leaf which appears next to the first true leaf. In the case of the dicotyledon such as *Solanum lycopersicum*, the seed leaves (two cotyledons) firstly develop from the hypocotyl, and then the first true leaf and the second true leaf successively develop from the terminal bud in accordance with the elongation of the stem (main stem portion) from growing the point disposed at the base portion of the cotyledons. In the case of a plant such as kidney bean and soybean in which the primary leaf (primordial leaf) appears between the cotyledon and the true leaf, the primary leaf (primordial leaf) is regarded as the first true leaf, and the radiation is performed before the second true leaf (true leaf further next to the true leaf next to the primary leaf) after the appearance of the primary leaf (primordial leaf).

It has been revealed in the method for producing the plant seedling according to the present invention that the microwave radiation is started at the specified radiation start timing to perform the radiation for a predetermined time as described later on, and thus the growth of the plant is remarkably facilitated as compared with any case in which the microwave radiation is started at any other timing, for example, at the seeding timing, the cotyledon formation timing, and the second true leaf formation timing.

The production of the plant seedling, which uses the microwave according to the present invention, is applicable to a variety of plants including the monocotyledon and the dicotyledon. However, the production of the plant seedling is preferable for the dicotyledon. In particular, the production of the plant seedling is preferable for the dicotyledon such as *Arabidopsis thaliana, Eruca vesicaria*, and *Solanum lycopersicum*.

Further, when the cultivation object is cultivated from a bulb, the microwave may be radiated after the bulb, which is planted in the soil in accordance with an ordinary method, germinates and the sprout appears on the ground surface. It is preferable that the microwave is radiated at the specified radiation start timing after the bulb planted in the soil germinates. The planting in the soil may be performed after the bulb germinates. In this case, it is preferable that the microwave is radiated before the germinated sprout becomes longer than a predetermined planting depth, and then the planting is performed in the soil in accordance with an ordinary method.

For example, the tubers and roots (potatoes), which include, for example, *Solanum tuberosum, Ipomoea batata*, and *Colocasia esculenta*, are cultivated by planting the so-called "seed tuber (seed corm) or seed potato". However, when the seed tuber (seed corm) is planted, the planting is performed in many cases after the formation of the sprout by performing the sprouting (forced sprouting). When the cultivation is performed by planting the seed tuber (seed corm), then the microwave may be radiated and the planting may be performed after performing the sprouting in accordance with an ordinary method. It is preferable that the microwave radiation is started at any timing ranging from the beginning of the appearance of the first true leaf to the timing provided before the beginning of the appearance of the second true leaf after the development of the first true leaf, i.e., at the specified radiation start timing. Note that the difference arises such that *Solanum tuberosum* is cultivated by using the tuber as the seed tuber, *Ipomoea batata* is cultivated by using the tuberous root as the seed tuber, and *Colocasia esculenta* is cultivated by using the corm as the seed tuber (seed corm). However, the specified radiation start timing is as described above in any case.

In order to radiate the microwave onto the germinated sprout or the seedling, for example, when the plant is cultivated by using a seedling pot, the microwave may be radiated by introducing the plant together with the seedling pot into an apparatus provided with a processing chamber for radiating the microwave. When tubers and roots (potatoes) are cultivated by planting the seed tuber (seed corm) or seed potato, the microwave may be radiated by introducing, into the apparatus, the seed tuber (seed corm) subjected to the sprouting.

Further, when the plant is cultivated by planting the plant in the ground, the microwave may be radiated toward the radiation object from a horn antenna attached to a microwave oscillator. In this procedure, the operation for radiating the microwave may be performed manually. However, when the plant is cultivated in a wide farmland, the operation can be also performed efficiently without relying on the manpower by utilizing, for example, a wireless control drone or helicopter (including multicopters).

When the microwave is radiated onto the germinated sprout or the seedling, it is preferable that the output and the radiation time thereof are appropriately adjusted to such an extent that the radiation object is not heated or warmed by the microwave (to such an extent that the temperature increase of the radiation object is not observed at a macroscopic level).

For example, it is preferable to radiate the microwave, while the output of the microwave is preferably not more than 50 W and more preferably not more than 30 W, further preferably 2 W to 30 W, most preferably 2 W to W.

If the output of the microwave radiated onto the cultivation object exceeds the foregoing range, particularly 30W, some plant individuals wither before the flowering in the growth process to be provided thereafter. Note that it has been revealed that the preferred output of the microwave for one seedling differs depending on the plant species according to Examples described later on. Therefore, the output of the microwave described above is the output per one seedling to twenty seedlings.

It is preferable to radiate the microwave assuming that the radiation time of the microwave is preferably not more than 120 minutes, more preferably not more than 90 minutes, and especially preferably not less than 10 minutes and not more than 60 minutes. There is such a tendency that the growth of the plant seedling depends on the radiation time when the microwave is radiated at the specified radiation start timing described above (see FIG. 13). However, has been revealed that even if the microwave is continuously radiated while the radiation time exceeds 120 minutes, any remarkable effect is not observed although the electric power consumption is large.

Note that in general, the microwave refers to an electromagnetic wave having a frequency of 300 MHz to 30 GHz (wavelength: 1 m to 1 cm), However, it is preferable to use a microwave in a band of 2.45 GHz which is internationally acknowledged to be used. As for the microwave radiation source, it is possible to use a magnetron and a semiconductor oscillator. When the magnetron is used, it is preferable to use a magnetron which constantly provides the microwave output and the frequency. Further, the magnetron cannot oscillate at a low output, for example, not more than 30 W in many cases. Therefore, when the output is adjusted to be not more than the above, it is possible to reduce the radiation electric power per one radiation object by simultaneously using a plurality of plants as radiation objects. Alternatively, the output may be adjusted by attenuating the microwave by installing any substance which absorbs the microwave in the radiation atmosphere. On the other hand, the semiconductor oscillator is excellent in the output stability and the frequency stability, and it is possible to perform the output control therefore. In view of the above, the semiconductor oscillator is a preferred microwave radiation source.

The growth of the plant usually undergoes the vegetative stage in which only the vegetative organs including, for example, leaves and stems are differentiated and formed after the germination, and the growth of the plant proceeds to the reproductive stage in which the reproductive organs are differentiated and generated to form the flower bud at the shoot apex so as to advance to the flowering and the fruition. In relation thereto, in the vegetative stage, a larger number of leaves are developed to perform the photosynthesis so that the sufficient nutrient is accumulated in order to form the seeds thereby. For this purpose, the formation of the flower bud is suppressed in accordance with the action of the gene. In accordance with the growth, the suppression is weakened in order to switch the stage to the reproductive stage. Further, it is acknowledged that the activation of the gene for facilitating the formation of the flower bud also contributes to the switching to the reproductive stage.

According to this embodiment, the microwave is radiated for the predetermined period of time onto the germinated sprout or the seedling at the predetermined timing after the seed or the bulb as the cultivation object germinates to form the sprout, particularly from the specified radiation start timing, and thus it is possible to advance the timing at which the stage is switched from the vegetative stage to the reproductive stage. It is speculated that this results from the weakened action of the gene which intends to suppress the formation of the flower bud at the vegetative stage by radiating the microwave onto the germinated sprout or the seedling, or this results from the activation of the action of the gene which intends to facilitate the formation of the flower bud. Otherwise, it is speculated that this results from the both.

Therefore, the method is especially preferable for the cultivation of the plant for which it is demanded that the timing of the switching from the vegetative stage to the reproductive stage is advanced to cause the flowering and the fruition early so that the harvest timing is advanced thereby, for example, the ornamental plant for the flower arrangement and the cut flower as well as the plant to produce the bulb and the fruit for food.

Further, the following situations have been observed. That is, in an environment which is arranged to be preferable for the growth of the plant, any conspicuous difference is not observed in the growth in the vegetative stage between those in which the microwave is radiated onto the germinated sprout or the seedling and those in which the microwave is not radiated. However, in an environment which as disadvantageous for the growth of the plant, the growth is improved in the vegetative stage in the case of those in which the microwave is radiated onto the germinated sprout or the seedling.

For example, in recent years, the attention is focused on the plant factory in which the plant is cultivated in such an institution that the internal environment is artificially controlled so that no influence is exerted by the change of the weather, and the internal environment is insulated from the outside so that neither pathogenic organism nor harmful insect causes any invasion. In the plant factory as described above, in many cases, leaf vegetables such as *Lactuca sativa* or the like are produced by means of the hydroponics. The following observation result has been obtained by an experiment performed by the present inventors, wherein plants in which the microwave is radiated onto the germinated sprout or the seedling are compared with those in which the microwave is not radiated by cultivating them with water in an amount smaller than an appropriate amount when the cultivation is performed by means of the hydroponics. That is, the growth condition in the vegetative stage is relatively improved for those in which the microwave is radiated onto the germinated sprout or the seedling, and the growth of the leaf is facilitated as compared with those in which the microwave is not radiated.

According to the fact as described above, it is also possible to expect that the time and labor, which are required to manage water, can be reduced by applying this embodiment when leaf vegetables such as *Lactuca sativa* or the like are cultivated by means of the hydroponics.

Further, the following observation results have been also obtained. That is, even when the watering stopped after the microwave radiation, the growth condition is maintained relatively satisfactorily as compared those cultivated under the same condition except that the microwave is not radiated. Even when the leaf size is compared, those irradiated with the microwave greatly grow. Further, the following observation results have been also obtained. That is, even in the case of being exposed to a high temperature environment (for example, about 40° C.) in a state of water shortage, when the watering is restarted thereafter, the flowering and the fruition are thereby caused without causing any withering at a high survival rate as compared with those in which the microwave is not radiated.

According to the fact as described above, it is also possible to expect that the cultivation can be performed with high resistance against the drying and the heat by applying this embodiment, for example, when the cultivation is performed in a natural environment including, for example, the outdoor cultivation.

As for the cultivation method and the cultivation environment to be adopted when the present invention is carried out, it is possible to appropriate any known or well-known environment as it is, including a method for thereafter growing the seedling obtained by the execution of the present invention as well. For example, there is no special limitation in relation to the hydroponics, the soil culture, and the hydroponic soil culture. No problem arises even in the case of the indoor environment such as those obtained in the plant factory or the like and the zero gravity space such as those obtained in the spaceship or the like.

EXAMPLES

The present invention will be explained in more detail below as exemplified by specified examples.

Example 1

*Arabidopsis thaliana* (Dicotyledoneae, Brassicaceae) was selected as the cultivation object, and seeds thereof were seeded in soil in accordance with an ordinary method. Note that as for *Arabidopsis thaliana*, many genes, which relate, for example, to the growth and the reproduction, are common to those of the other plants. The results of the studies concerning genes of *Arabidopsis thaliana* are widely applied to the other plants as well. According to this fact, *Arabidopsis thaliana* was selected as the cultivation object in Example 1.

The seeded seeds were divided into five groups, and the growth conditions were observed. As a result, seed leaves appeared on the ground surface one week thereafter. Then, one week thereafter (two weeks after the seeding), the formation of second true leaves was successfully confirmed.

At this point in time, the microwave in the 2.45 GHz band was radiated at an output of 23 W for 10 minutes, 20 minutes, 30 minutes, and 60 minutes respectively onto those belonging to the second to fifth groups. The first group was not irradiated with the microwave, which was designated as a control group.

Figure 1:
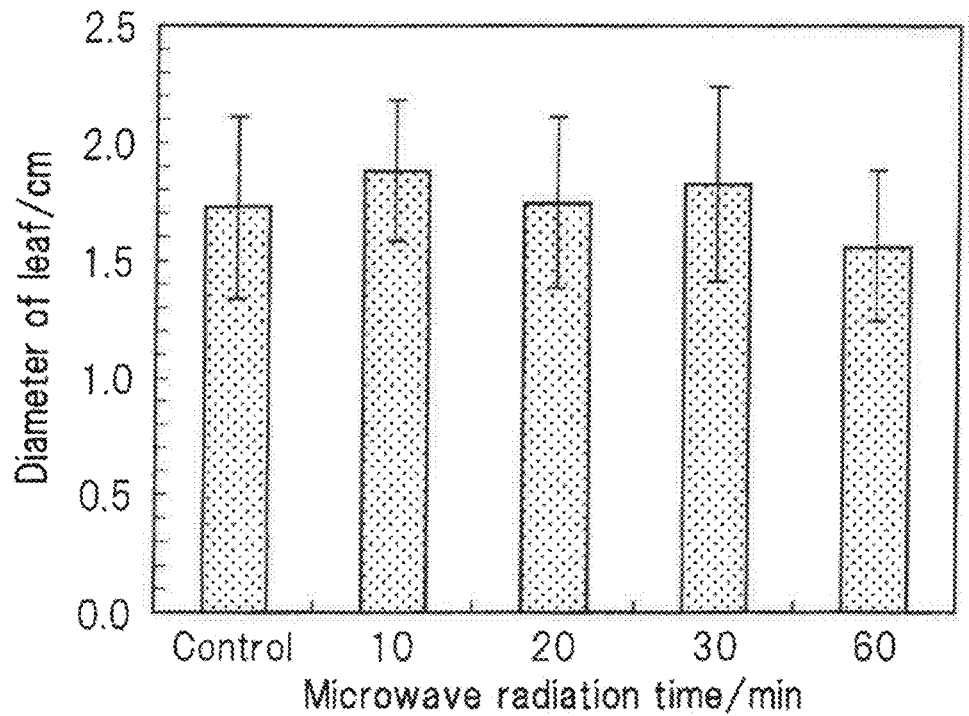
FIG. 1 shows a graph illustrating results obtained by measuring diameters of leaves expanded or spread in a rosette form of cultivation objects three weeks after the seeding in Example 1.
Figure 2:
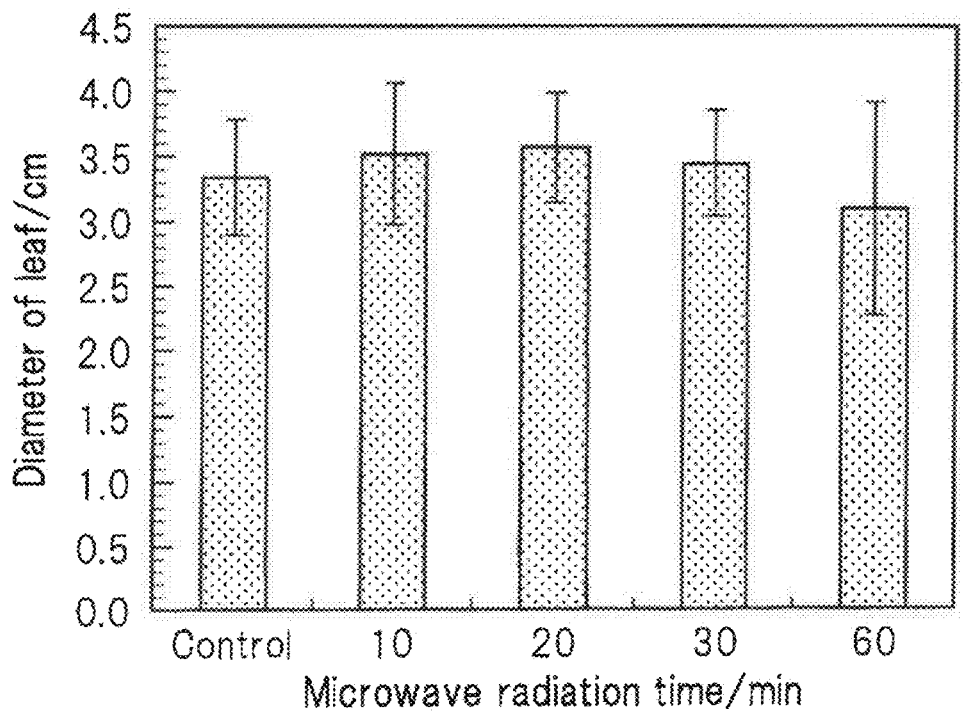
FIG. 2 shows a graph illustrating results obtained by measuring diameters of leaves expanded or spread in a rosette form of cultivation objects four weeks after the seeding in Example 1.

The diameters of leaves expanded or spread in a rosette form were measured three weeks and four weeks after the seeding. Obtained results are shown in FIGS. 1 and 2 respectively. According to the measurement results, it has been successfully confirmed that any conspicuous change is not found in relation to the diameter of the leave, and the microwave radiation exerts little influence on the vegetative stage of the plant.

Figure 3:
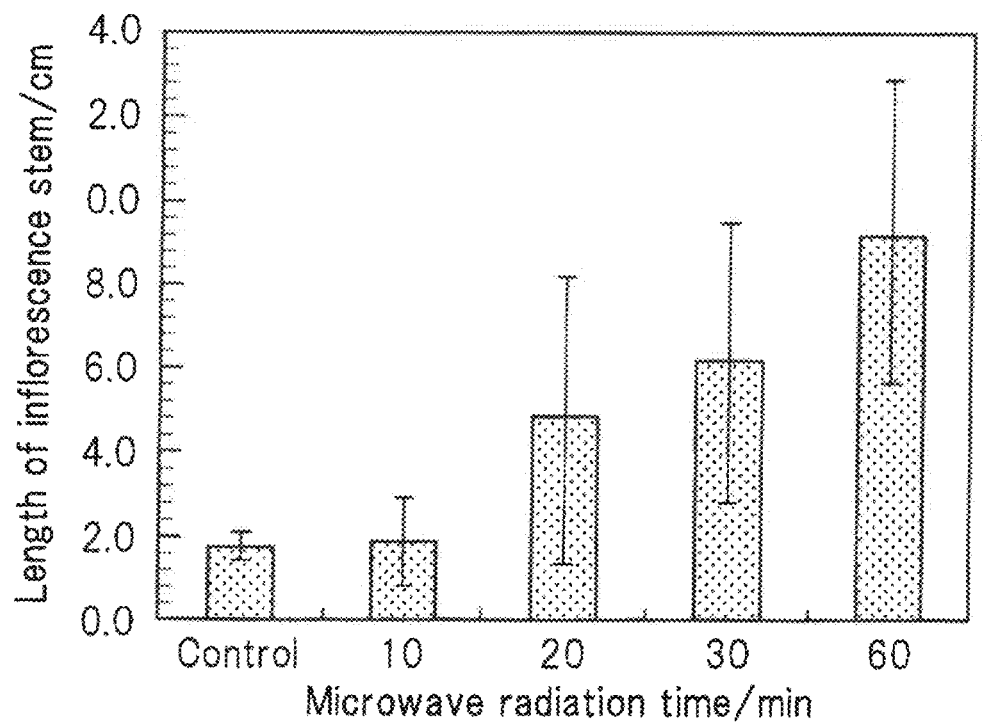
FIG. 3 shows a graph illustrating results obtained by measuring lengths of stems (inflorescence stems) of cultivation objects five weeks after the seeding in Example 1.
Figure 4:
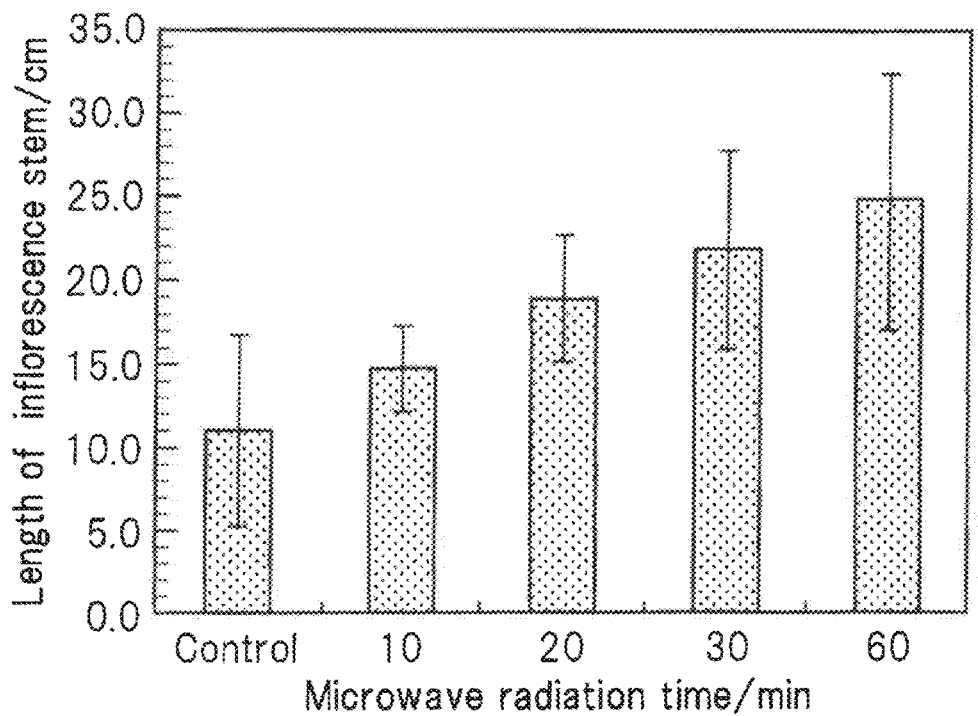
FIG. 4 shows a graph illustrating results obtained by measuring lengths of stems (inflorescence stems) of a cultivation object six weeks after the seeding in Example 1.

Subsequently, the lengths of the stems (inflorescence stems) were measured five weeks and six weeks after the seeding. Obtained results are shown in FIGS. 3 and 4 respectively. According to these results, has been successfully confirmed that the growth of the inflorescence stem is advanced by the microwave radiation. After that, the flower buds were formed at inflorescence stem apexes in an order starting from those in which the growth of the inflorescence stem was advanced, and the flowering and the fruition were caused. Therefore, it has been successfully confirmed that the timing, at which the stage is switched from the vegetative stage to the reproductive stage, is advanced, and the flowering and the fruition are caused early by means of the microwave radiation.

Example 2

*Arabidopsis thaliana* (Dicotyledoneae, Brassicaceae) was selected as the cultivation object, and seeds thereof were seeded in soil in accordance with an ordinary method.

The seeded seeds were divided into seven groups. At a point in time at the formation of the second true leaf was successfully confirmed two weeks after the seeding, the microwave in the 2.45 GHz band was radiated at an output of 23 W for 10 minutes, 20 minutes, 30 minutes, 1 hour, 2 hours, and 4 hours respectively onto those belonging to the second to seventh groups. The first group was not irradiated with the microwave, which was designated as a control group.

Figure 5:
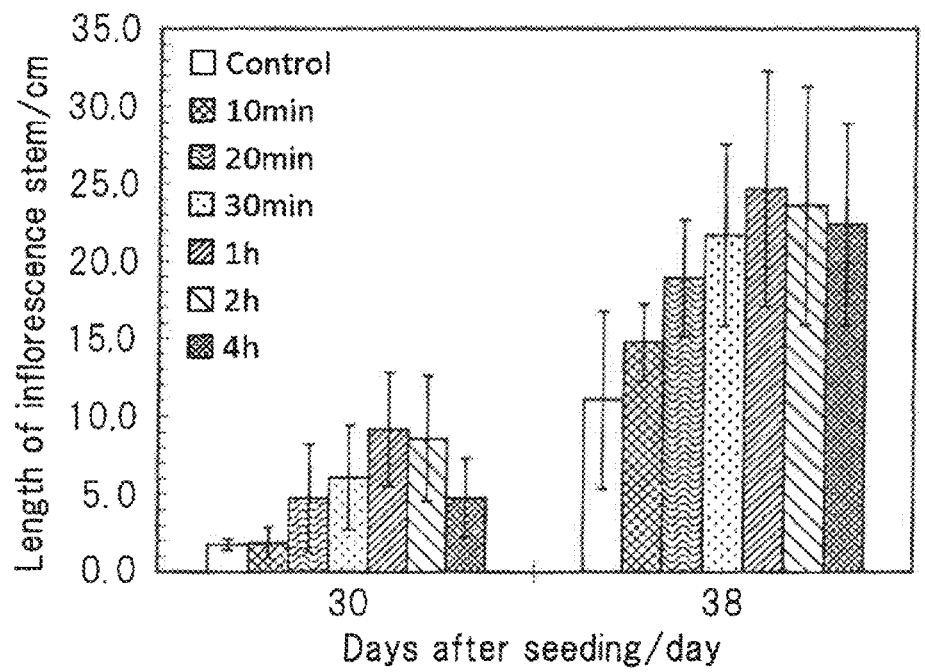
FIG. 5 shows a graph illustrating results obtained by measuring lengths of stems (inflorescence stems) of cultivation objects on the 30th day and the 38th day after the seeding in Example 2.

The lengths of the inflorescence stems were measured on the 30th day and the 38th day after the seeding. Obtained results are shown in FIG. 5. According to these results, the following fact has been successfully confirmed. That is, the growth of the inflorescence stem is the fastest in the plant irradiated with the microwave for 1 hour. The fast growth of the inflorescence stem next thereto is caused in the plant irradiated with the microwave for 2 hours. On the contrary, any conspicuous effect is not found even when the radiation time is prolonged to be longer than 2 hours.

Example 3

*Arabidopsis thaliana* (Dicotyledoneae, Brassicaceae) was selected as the cultivation object, and seeds thereof were seeded in soil in accordance with an ordinary method.

The seeded seeds were divided into two groups. As for one group, the microwave in the 2.45 GHz band was radiated at an output of 23 W for 60 minutes at a point in time at which the formation of the second true leaf was successfully confirmed two weeks after the seeding, in the same manner as Example 1. The other group was not irradiated with the microwave, which was designated as a control group.

The watering was stopped for the both groups after the radiation of the microwave onto the one group, and the growth on the 30th day after the seeding were observed. As for the group irradiated with the microwave, the growth was maintained relatively satisfactorily as compared with the control group. Even when the leaf size was compared, those irradiated with the microwave greatly grew.

Example 4

*Arabidopsis thaliana* (Dicotyledoneae, Brassicaceae) was selected as the cultivation object, and seeds thereof were seeded in soil in accordance with an ordinary method.

The seeded seeds were classified into two groups. As for one group, the microwave in the 2.45 GHz band was radiated at an output of 23 W for 60 minutes at a point in time at which the formation of the second true leaf was successfully confirmed two weeks after the seeding, in the same manner as Example 1. The other group was not irradiated with the microwave, which was designated as a control group.

The watering was stopped for the both groups after the radiation of the microwave onto the one group. 28 days after the seeding, the plants were stationarily placed for 4 hours in a thermostatic chamber set at 40° C. The watering was restarted 2 days after the plants were taken out from the thermostatic chamber (on the 30th day after the seeding) to observe the growth. After that, the rate (survival rate), at which the plants were subjected to the flowering and the fruition without causing the withering, was about 60% in the case of the control group. On the contrary, the rate (survival rate) was about 90% in the case of the group irradiated with the microwave. A remarkable difference was found in the survival rate.

Example 5

*Solanum tuberosum* (Dicotyledoneae; Solanaceae) was selected as the cultivation object. Seed tubers or seed potatoes (tubers) thereof were divided into two groups. As for one group, the microwave in the 2.45 GHz band was radiated at an output of 23 W for 60 minutes onto sprouts elongated to about 2 to 3 mm. The other group was not irradiated with the microwave, which was designated as a control group. The plants were planted in soil in accordance with an ordinary method at a planting depth of about 5 cm.

Figure 6:
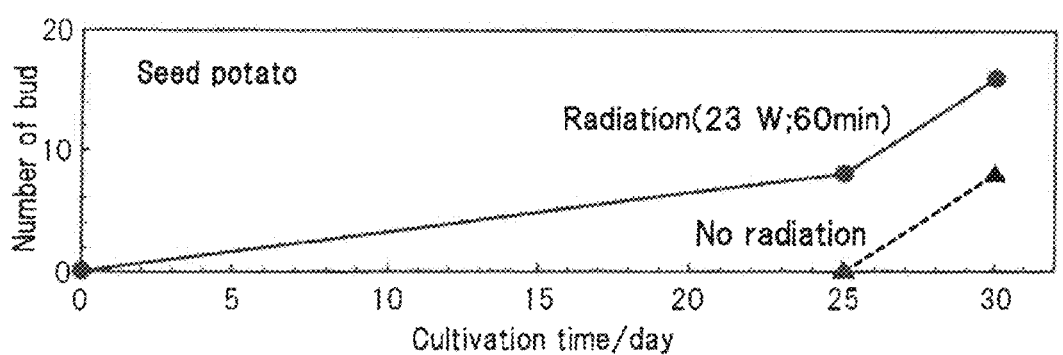
FIG. 6 shows a graph illustrating results obtained by measuring the number of formed buds of cultivation objects in Example 4.
Figure 7:
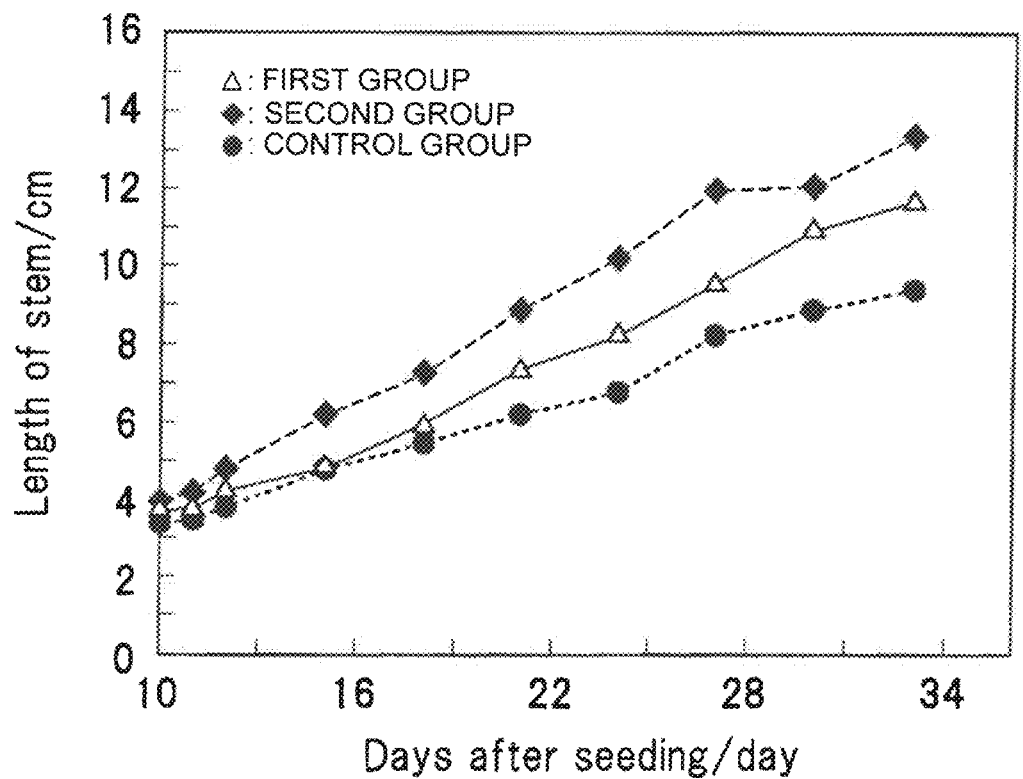
FIG. 7 shows a graph illustrating the change in the height of the stem on and after the 10th day after the seeding in Example 6.
Figure 8:
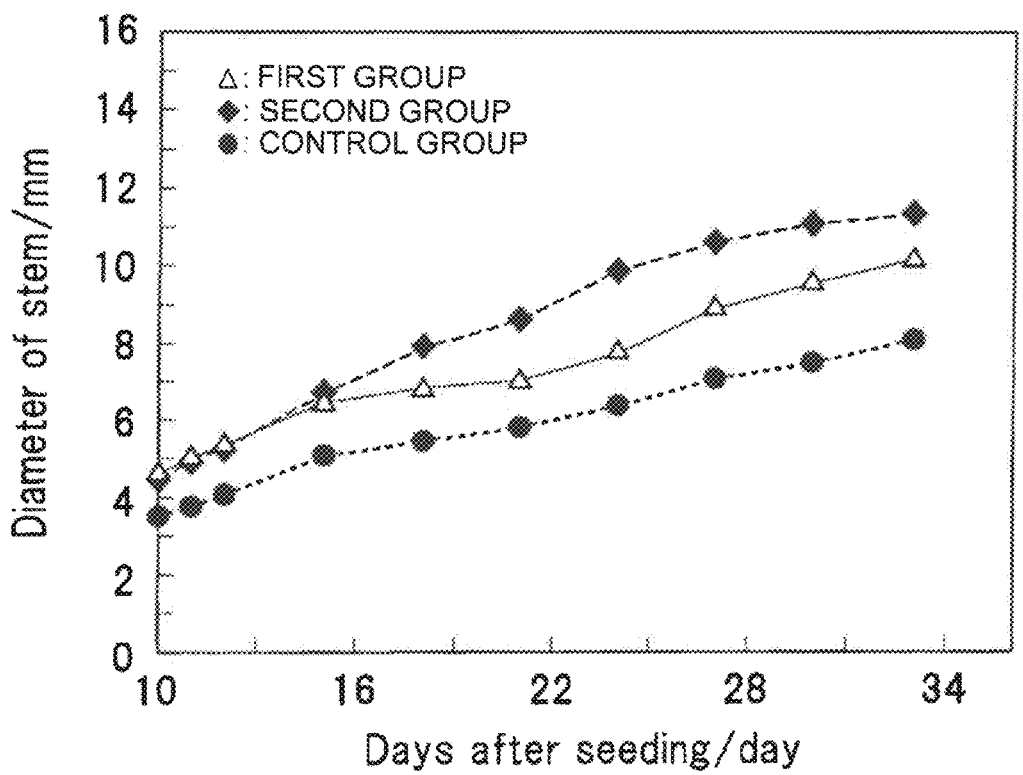
FIG. 8 shows a graph illustrating the change in the diameter of the stem on and after the 10th day after the seeding in Example 5.

The numbers of buds were measured 25 days and 30 days after the planting of the seed tubers. Obtained results are shown in FIG. 6. According to these results, it has been successfully confirmed that the formation of the bud is facilitated by the radiation of the microwave, and the transition to reproductive stage is advanced by the microwave radiation in the case of *Solanum tuberosum* as well.

Example 6

*Solanum tuberosum* (Dicotyledoneae; Solanaceae) was selected as the cultivation object, and seed tubers were subjected to the sprouting in accordance with an ordinary method. The seed tubers having been subjected to the sprouting were divided into two groups. The sizes were uniformized so that the sizes of the seed tubers of one group were about half the sizes of the seed tubers of the other group. The microwave in the 2.45 GHz band was radiated at output of 28 W for 60 minutes onto those of the group having the small sizes of the seed tubers. The group of those having the larger sizes of the seed tubers was not irradiated with the microwave, which was designated as a control group. The plants were planted in soil in accordance with an ordinary method, and the plants were cultivated so that the growth other than the size of the seed tuber were identical.

In the case of the group irradiated with the microwave, buds appeared on the ground surface 3.5 days after the planting in average. On the other hand, in the case of the control group, buds appeared on the ground surface 6.4 days after the planting in average.

The lengths of stems were measured 19 days after the planting. As a result, the length was 48.2 cm in average in the case of the group irradiated with the microwave. On the other hand, in the case of the control group, the length was 34.5 cm in average.

Further, the diameters of stems were measured 36 days after the planting. As a result, the diameter was 8.03 mm in average in the case of the group irradiated with the microwave. On the other hand, in the case of the control group, the diameter was 5.50 mm in average.

Further, the numbers of flowers were counted 36 days after the planting. As a result, the number was 12 in the case of the group irradiated with the microwave, while the number was 5 in the case of the control group. According to these results, it has been successfully confirmed that the growth of Solanum tuberosum is facilitated by the radiation of the microwave even under the disadvantageous growth condition in which the size of the seed tuber is small and the amount of nutrient is small.

Example 7

Lactuca sativa (Dicotyledoneae; Asteraceae, variety: gentilina green) was selected as the cultivation object, and seeds thereof were seeded in a seedbed for hydroponics in accordance with an ordinary method.

The seeded seeds were divided into four groups. The microwave in the 2.45 GHz band was radiated at an output of 25 W for 60 minutes at a timing at which the cotyledon completely developed 3 days after the germination in the case of the first and second groups. The microwave was not radiated onto the third and fourth groups.

The plants in the first group irradiated with the microwave and the plants in the third group not irradiated with the microwave were cultivated while giving an appropriate amount of water, and the growth thereof were observed from the first day to the 24th day after the seeding. As a result, any conspicuous difference was not observed in relation to the growth conditions.

On the other hand, the plants in the second group irradiated with the microwave and the plants in the fourth group not irradiated with the microwave were cultivated while giving water in an amount smaller than the appropriate amount (approximately the half of the amount of water regarded as the appropriate amount), and the growth thereof were observed from the first day to the 24th day after the seeding. In the case of the second group irradiated with the microwave, the growth condition was maintained relatively satisfactorily as compared with the fourth group not irradiated with the microwave. Even when the leaf size was compared, the plants of the second group irradiated with the microwave grew greatly.

Example 8

Figure 11:
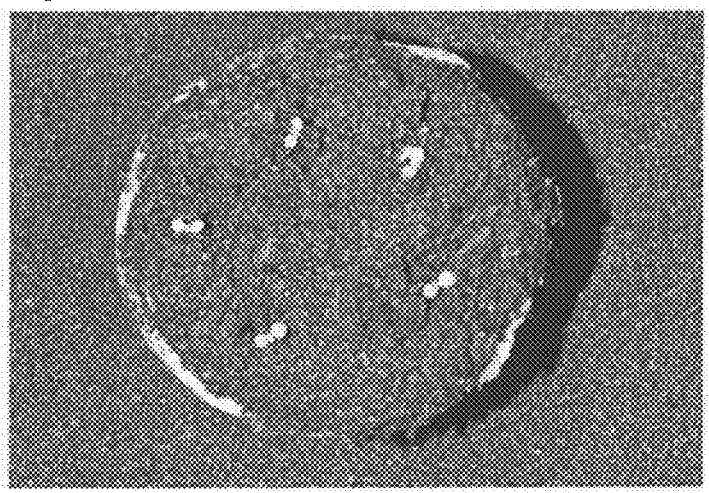
FIG. 11 shows a photograph illustrating a situation of seedlings immediately after transplanting five buds in one pot containing potting compost in Example 8.

Arabidopsis thaliana (Dicotyledoneae, Brassicaceae) was selected as the growth object, and seeds thereof were seeded in a pot (Jiffy-7) containing potting compost in accordance with an ordinary method. The microwave radiation was started at different timings of seed, bud, and seedling. A microwave radiation apparatus having a magnetron oscillator was used as a microwave radiation source. Specifically, the radiation of the microwave in the 2.45 GHz band was started at an output of 23 W with respect to a plurality of specimens, which were classified into the stage of seed, the stage of germination (7 days after the seeding), and the respective stages of 8 days, 10 days, 12 days, 14 days, 16 days, 18 days, and 21 days after the seeding. Five plants of seeds, buds, or seedlings were planted in one pot containing the potting compost. In this form, the four pots were accommodated in the microwave radiation apparatus. That is, the microwave was radiated at 23 W with respect to the twenty seeds, buds, or seedlings in total. In order to uniformly radiate the microwave onto the specimens, the radiation was performed with a distance of 24 cm from the specimens. The radiation time was 1 hour in any case. Note that in the experiment, a plurality of seeds was bred in one pot for 7 days after the seeding. Those having similar or identical growing speeds were selected, and 5 specimens of them were transplanted to a new soil pot on the 8th day, and thus the experiment was performed while uniformizing the bud size. For reference, FIG. 11 shows a photograph obtained by photographing the seedlings in the soil pot immediately after the transplantation. Note that two types were used as the specimens irradiated with the microwave at the seed stage, i.e., the seeds (dry seeds) which were dried without giving water and the seeds (water absorption seeds) which absorbed water by immersing the dry seeds in water for 1 day. However, the specimens used for the observation were the water absorption seeds in any case except for the dry seeds.

The following growth states were observed respectively in relation to the leaves at every elapsed times after the seeding. That is, the cotyledons completely developed after 8 days, the true leaves appeared after 10 days, parts of the true leaves developed after 12 days, the true leaves completely developed after 14 days, the six leaves (second true leaves) appeared after 16 days, the six leaves developed after 18 days, and the next leaves further appeared after 21 days.

Figure 9:
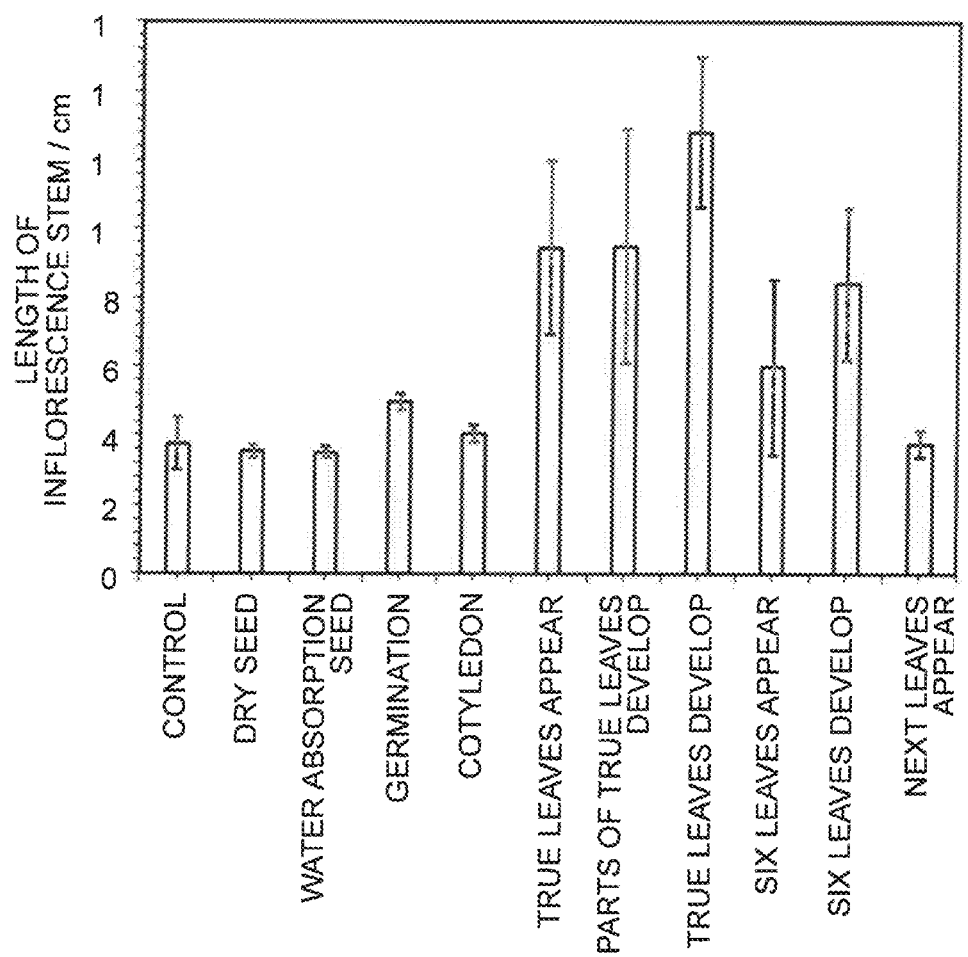
FIG. 9 shows a graph illustrating the lengths of inflorescence stems as obtained after the elapse of 6 weeks from the seeding in relation to specimens of *Arabidopsis thaliana* having different timings of microwave radiation in Example 8.

The lengths of inflorescence stems of Arabidopsis thaliana obtained after the elapse of 6 weeks after the seeding were measured for the respective specimens. Results are shown in Table 1 and a graph shown in FIG. 9. In FIG. 9, the control indicates the specimen which was not irradiated with the microwave at any stage.

TABLE 1

| Timing of start of microwave radiation | | Length of inflorescence stem after 6 weeks/cm |
|---|---|---|
| Control | no radiation | 3.8 |
| Dry seed | dry seed | 3.6 |
| Water absorption seed | water absorption seed | 3.5 |
| 7 days after seeding | germination | 5.0 |
| 8 days after seeding | cotyledons develop | 4.1 |
| 10 days after seeding | true leaves appear | 9.5 |
| 12 days after seeding | true leaves partially develop | 9.5 |
| 14 days after seeding | true leaves develop | 12.8 |
| 16 days after seeding | six leaves appear | 6.0 |
| 18 days after seeding | six leaves develop | 8.4 |
| 21 days after seeding | next leaves further appear | 3.8 |

According to the graph shown in FIG. 9, it has been revealed that no difference arises in the growth (length) of the inflorescence stem as compared with the control even when the microwave is radiated onto the dry seed and the water absorption seed. However, it has been revealed that when the microwave is radiated onto the water absorption seed, the growth speed is quickened 1.6 times as compared with the control. When the microwave is radiated at the germination stage and the cotyledon stage, the inflorescence stem grows faster as compared with the control. On the other hand, it has been revealed that the length of the inflorescence stem grows about 2.5 times as compared with the seed and the control by starting the microwave radiation on the 10th day on which the true leaf begins to appear. Further, it has been revealed that when the microwave is radiated at the timing of the 14th day at which the true leaf develops, the growth is facilitated not less than 3 times as compared with the seed and the control. On the other hand, it is appreciated that when the microwave is radiated on and after the 16th days on which the six leaves appear, then the growth is facilitated not less than 2 times as compared the seed and the control, but the growth of the inflorescence stem is inferior as compared with the beginning of the appearance of the true leaf and the timing of the partial development.

Growth of Seedling Depending on Difference Microwave Output

Figure 12:
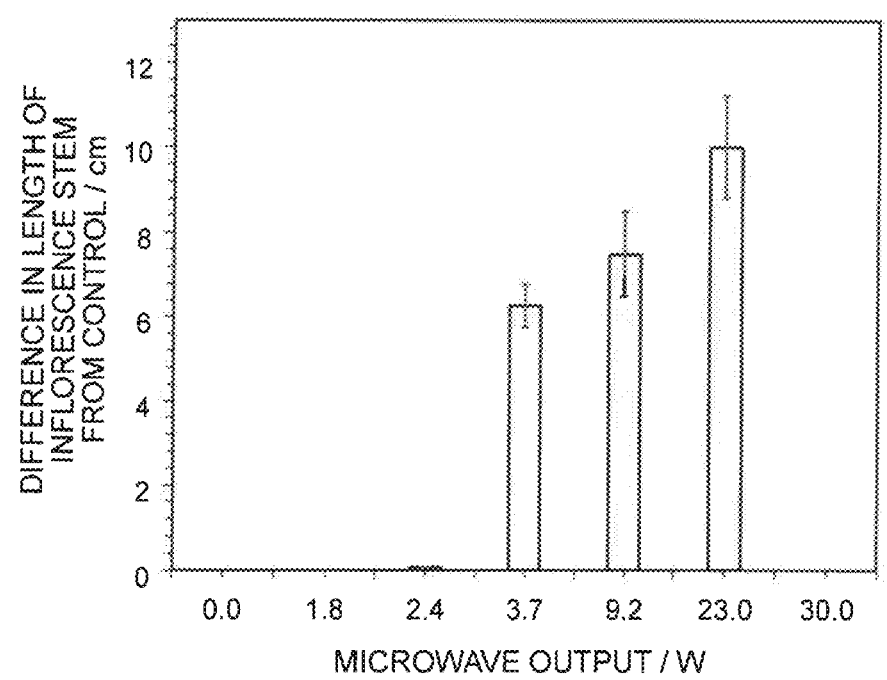
FIG. 12 shows a graph illustrating the lengths of inflorescence stems as obtained when microwaves having different outputs were radiated at a timing of first true leaf development in Example 8, the lengths of inflorescence stems being shown as differences from a length of a inflorescence stem of control.

In order to investigate the optimum radiation output of the microwave with respect to the facilitation of the growth of the seedling, an experiment was performed to compare the growth of the plant by previously providing different microwave outputs. That is, the radiation was performed so that the output of the microwave radiated onto one seedling differs at the stage at which the first true leaf developed, and the investigation was made for the length of the inflorescence stem in the same manner as in the example described above. Specifically, the output of the microwave was basically a constant value of 23 W, but the number of seedlings or pots to be accommodated in the microwave radiation apparatus was changed. Thus, the radiation power was changed per one seedling. Results are shown in FIG. 12 as the difference from the length of the inflorescence stem of the control onto which the microwave was not radiated. The numbers of the seedlings (plants) simultaneously subjected to the radiation while being accommodated in the microwave radiation apparatus corresponding to the respective outputs of the microwave shown in FIG. 12 are as follows. Note that as for the samples of the output of 30 W, the radiation was performed while controlling the microwave output so that the microwave output was increased from 23 W to 30 W. However, some seedlings grew to approximately the same extent as that of the control, and other seedlings withered.

30 W=4 pots (4 pots×5 plants=20 plants)

23 W=4 pots (4 pots×5 plants=20 plants)

9.2 W=10 pots (10 pots×5 plants=50 plants)

3.7 W=25 pots (25 pots×5 plants=125 plants)

2.4 W=40 pots (40 pots×5 plants=200 plants)

1.8 W=50 pots (50 pots×5 plants=250 plants)

According to these results, it is appreciated that the growth of the inflorescence stem is most facilitated at the output of the microwave of 23 W.

Growth of Seedling Depending on Difference in Microwave Radiation Time

Figure 13:
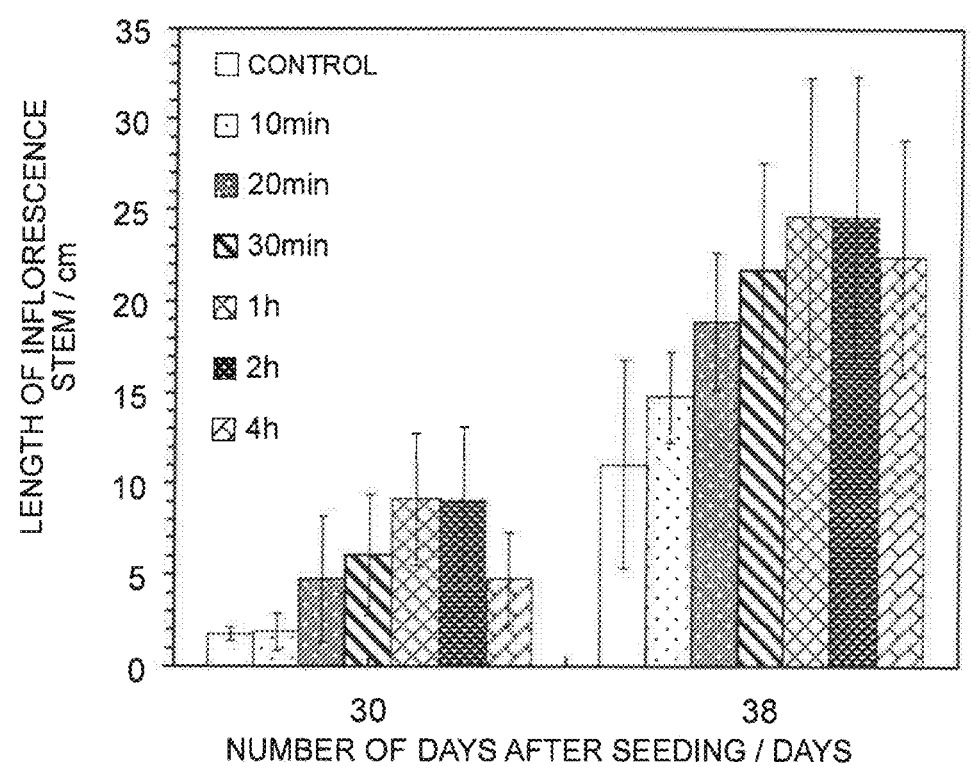
FIG. 13 shows a graph illustrating the lengths of inflorescence stems as obtained when a microwave was radiated for different radiation times at a timing of first true leaf development in Example 8.

In order to determine the optimum value of the microwave radiation time, the length of the inflorescence stem of *Arabidopsis thaliana* was measured on the 30th day and the 38th day after the seeding, when the plants were grown following the pre-irradiation with the microwave at the first true leaf development timing for different radiation times respectively. The growth condition was the same as or similar to that adopted when the growth was caused while performing the irradiation with the microwave at the first true leaf development timing in the example described above except for the radiation time. Results are shown in FIG. 13. According to the results shown in FIG. 13, it is appreciated that the growth is facilitated depending on the radiation time until the radiation time arrives at 1 hour. On the other hand, it is appreciated that the radiation of the microwave for the radiation time exceeding 1 hour is not effective so much. Therefore, the radiation time was optimally 1 hour.

Figure 10:
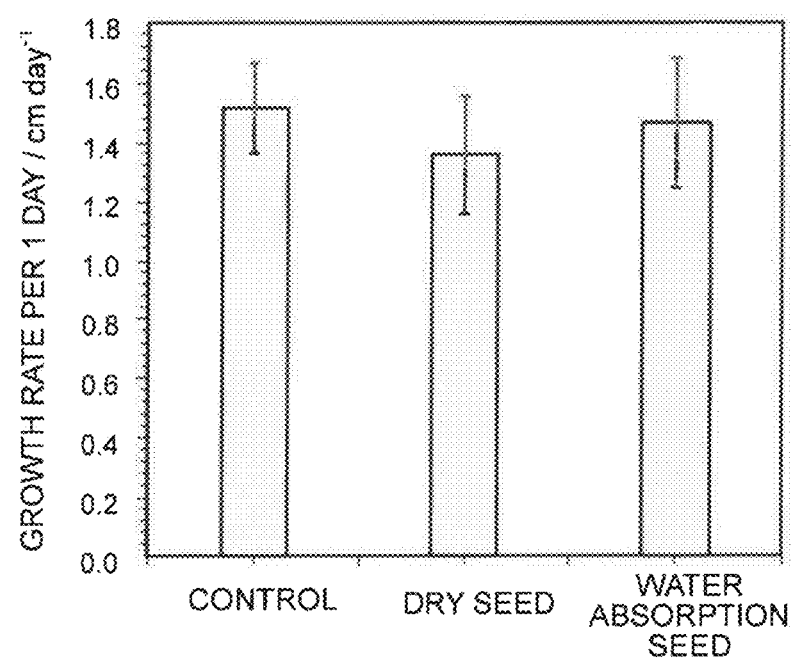
FIG. 10 shows a graph illustrating the elongation rates of inflorescence stems per day as obtained when the microwave was radiated onto dry seeds and seeds subjected to water absorption in Example 8.

Difference in Growth of Seedling Depending on Drying and Water Absorption of Seed FIG. 10 shows a graph illustrating the elongation rate per one day as obtained when the microwave was radiated onto seeds. According to FIG. 10, the growth speed of the water absorption seed was faster than that of the dry seed, but the growth speed was approximately the same as that of the control. According to FIG. 9, no change occurs in relation to the actual growth length. Therefore, it has been revealed that the facilitation of the growth is not caused in relation to the length of the inflorescence stem even when the microwave is radiated onto the seed, although the speed may be advanced in relation to the germination and the growth of the root as reported in the prior art.

Example 9

*Eruca vesicarda* was used as the growth object in place of *Arabiaopsis thaliana* to observe the difference in the growth state of the leaves depending on the different radiation timings of the microwave in the same manner as in Example 8. *Eruca vesicaria* was grown on the hydroponics by using the following condition and the equipment. Green Growth Apparatus produced by U-ING was used to grow *Eruca vesicaria*. Seeds were applied to appended sponge. The microwave radiation was performed as follows. That is, the sponge, which was in a state of the seed or the germination, was taken out from the growth apparatus. The radiation was performed for 1 hour in the microwave radiation apparatus, and the sponge was immediately returned into the growth apparatus. The hours of sunlight were 16 hours. Water and a slight amount of appended liquid fertilizer were added to a lower tank of the growth apparatus. The microwave radiation was started for a plurality of seed specimens of *Eruca vesicaria* at different timings of seeds and inflorescence stems. Specifically, the radiation of the microwave in the band of 2.45 GHz was started at an output of 23 W with respect to the respective specimens, while being classified into the stage of seed and the respective stages 4 days, 8 days, 10 days, 14 days, and 16 days after the seeding. That is, the microwave output of 23 W was provided per one seed or one bud. A magnetron oscillator was used as the microwave radiation source. The radiation was performed while providing a distance of 24 cm from the specimen. Note that the two types were used, i.e., the seeds (dry seeds) to which no water was fed and the seeds (water absorption seeds) into which water was absorbed by immersing the dry seeds in water for 1 day, as the specimens irradiated with the microwave at the stage of seed. However, the specimen, which was used for the observation, was the water absorption seed in any case except for the dry seed.

As for the growth states of the leaves at every elapsed times from the seeding, the following states were observed respectively. That is, the germination was caused (bud) after 4 days, the cotyledon completely developed after 8 days, the true leaf began to appear after 10 days, the true leaf completely developed after 14 days, the six leaves (second true leaves) began to appear after 16 days, the six leaves developed after 18 days, and the next leaves further appeared after 21 days.

Figure 14:
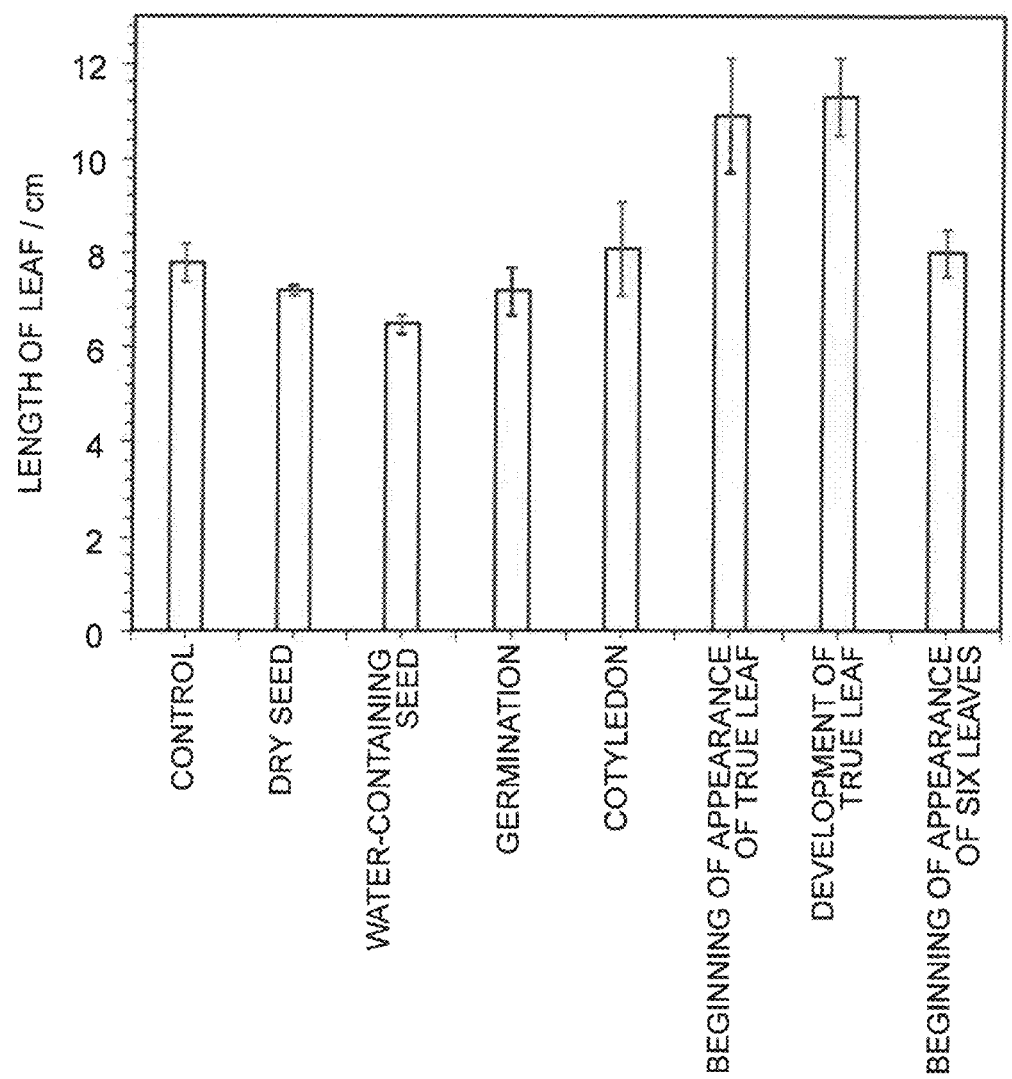
FIG. 14 shows a graph illustrating the lengths of leaves after the elapse of 25 days from the seeding in relation to specimens of *Eruca vesicaria* having different timings of microwave radiation in Example 9.

The length of the leaf of *Eruca vesicaria* was measured after the elapse of 25 days after the seeding in relation to each of the specimens. Results are shown in a graph in FIG. 14. In FIG. 14, the control is the specimen onto which the microwave was not radiated at any stage. According to the graph shown in FIG. 14, the growth (length) of the leaf was slightly delayed as compared with the control even when the microwave was radiated onto the dry seed and the water absorption seed. Further, it has been revealed that the growth (length) of the leaf has no difference as compared with the control as well when the microwave was radiated at the germination stage and the cotyledon stage. On the other hand, it has been revealed that the growth was facilitated by about 28% for the length of the leaf as compared with the control by starting the radiation of the microwave on the 10th day on which the true leaves began to appear. Further, it has been revealed that the growth was facilitated by about 31% as compared with the seed and the control by radiating the microwave at the timing on the 14th day on which the true leaves developed. On the other hand, it has been revealed that the growth was inferior as compared with the beginning of the appearance of the true leaf and the timing of the partial development even when the microwave was radiated on any day on or after the 16th day on which the six leaves began to appear.

An experiment was performed in the same manner as described above, provided that the output of the microwave was controlled and weakened to 20 W. It has been revealed that no change arose in the tendency concerning the radiation start timing and the leaf length, although the length of the leaf was shortened by about 8% as an effect of the microwave radiation.

Example 10

*Solarium lycopersicum* (Dicotyledoneae; Solanaceae) was selected as the cultivation object, and seeds thereof were seeded in soil in accordance with an ordinary method. The microwave radiation was started at different timings of seed and seedling with respect to a plurality of *Solanum lycopersicum* specimens. Specifically, the radiation of the microwave in the band of 2.45 GHz was started at two types of outputs of 25 W and 50 W with respect to the plurality of specimens, which were classified into six stages; the stage of seed, the stage immediately after the seeding, and the stages 9 days, 10 days, 13 days, and 15 days after the seeding respectively. Note that the microwave was radiated for every four seeds or buds. A magnetron oscillator was used as the microwave radiation source, and the radiation was performed for 1 hour while providing a distance of 24 cm from the specimen. Note that water-containing seeds were used as the seeds.

The following growth states were observed respectively for the leaves at every elapsed times from the seeding. That is, the cotyledon appeared after 9 days (perfect two leaves), the first true leaf appeared after 10 days, the first true leaf completely developed after 13 days, and the six leaves (second true leaves) appeared after 15 days.

Figure 16:
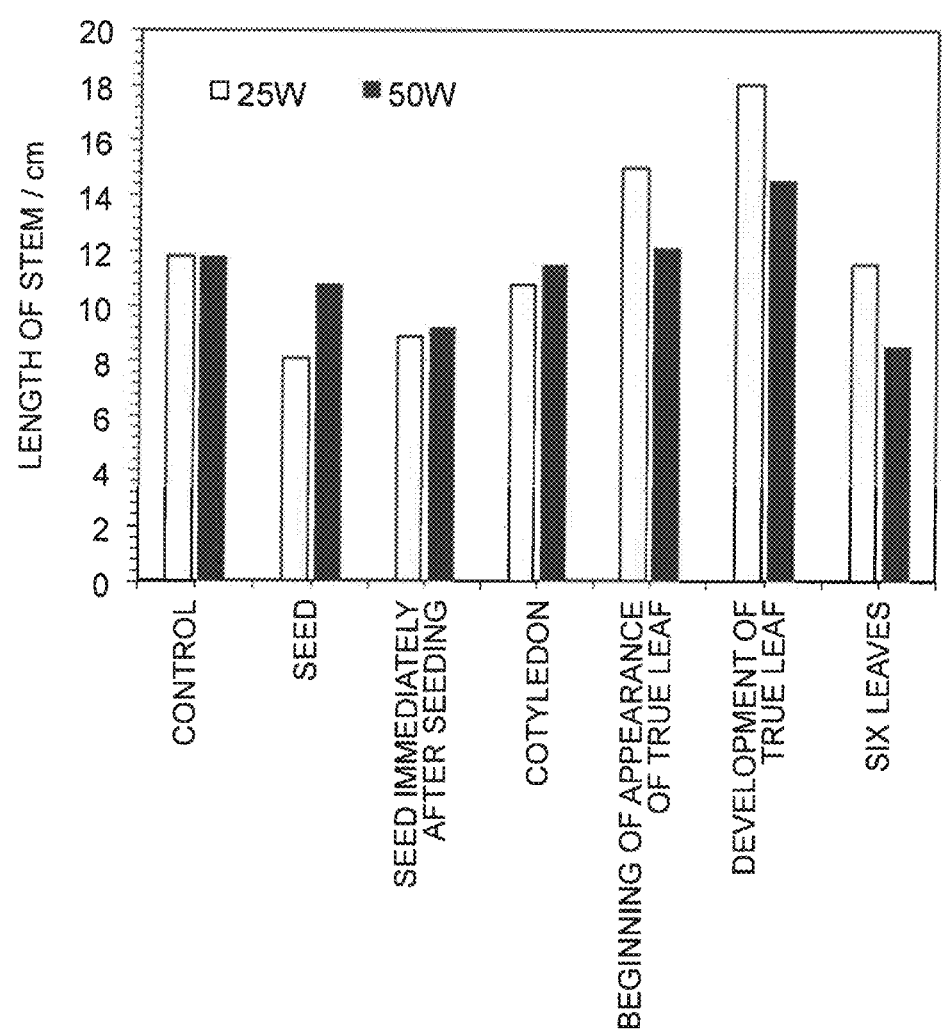
FIG. 16 shows a graph illustrating the lengths of stems or stalks after the elapse of 47 days after the seeding in relation to specimens of *Solanum lycopersicum* having different timings of microwave radiation in Example 10, wherein results obtained at microwave radiation powers of 25 W and 50 W are shown together in the graph.

As for the growth states of the observed leaves of *Solanum lycopersicum*, photographs are shown FIGS. 15A to 15D respectively, which depict the situations of the fully-expanded two leaves (cotyledons: 9th day), the beginning of to appearance of the four leaves (first true leaves: 10th day), the development of the four leaves (13th day), and the beginning of appearance of the six leaves (15th day). Further, the heights of the seedlings on the 47th day after the seeding as provided when the microwave was radiated at various timings are shown in a graph of FIG. 5. Results are shown in FIG. 16 for each of the outputs (25 W, 50 W) of the microwave. According to the graph shown in FIG. 5, even when the microwave was radiated at the stages of seeds and cotyledons, the facilitation of the growth was not observed as compared with the control. On the other hand, it has been revealed that the growth was facilitated by starting the radiation of the microwave at the stages of the beginning of the appearance and the development of the true leaf. In particular, it has been revealed that the growth was most facilitated when the microwave was radiated at the stage of the development of the first true leaf (in the case of 25 W, the growth of the stem is observed, which is not less than two times the growth to be obtained when the radiation is performed onto the seed, and not less than 1.5 times the growth to be obtained when the radiation is performed onto the cotyledon). It has been also revealed that the growth facilitation effect is not observed at the stage of the six leaves, i.e., at the stage of the second true leaves. Further, as for the output of the microwave, the growth of the seedling is more facilitated at 25 W as compared with 50 W when the microwave is radiated at the timings of the beginning of the appearance of the true leaf and the development of the true leaf.

The present invention has been explained above as exemplified by the preferred embodiments. However, the present invention is not limited to the embodiments described above. It goes without saying that the present invention can be variously changed within the scope of the present invention. As for *Arabidopsis thaliana* used in Example, many genes, which relate, for example, to the growth and the reproduction, are common to those of the other plants. The results of the studies concerning the genes of *Arabidopsis thaliana* are widely applied to the other plants as well. Therefore, it is speculated that Example concerning *Arabidopsis thaliana* provides similar results for the other varieties or species. The growth facilitation effect is also expected by starting the radiation of the microwave during the period ranging from the beginning of the appearance of the first true leaf to the timing provided before the appearance of the second true leaf in the same manner as in Examples 8 to 10, for example, in relation to *Lactuca sativa* (Dicotyledoneae; Asteraceae, variety: gentilina green) and *Solanum tuberosum* (Dicotyledoneae; Solanaceae) as other dicotyledon species.

According to the present invention, the radiation of the microwave, which is performed in order to facilitate the growth of the plant seedling, is started at predetermined timing. Therefore, the method, in which the electric power is low and the growth of the plant can be remarkably facilitated, has been successfully established. Therefore, when the method of the present invention is used, it is possible to improve the efficiencies of the growth and the harvest of the plant. It is possible to contribute to the field of the agriculture including, for example, the plant factory and the outdoor cultivation.

The invention claimed is:

1. A method for cultivating a plant to facilitate growth of the plant by radiating a microwave, comprising:
   radiating the microwave onto a sprout or a seedling of a cultivation object for not more than 120 minutes at a predetermined timing provided after a seed or a bulb of the cultivation object germinates to form the sprout; wherein the irradiating is performed only at the predetermined timing after a seed or a bulb of the cultivation object germinates to form the sprout.

2. The method for cultivating the plant according to claim 1, wherein the microwave is radiated at a timing at which the plant is raised from the seed after the seed germinates.

3. The method for cultivating the plant according to claim 1, wherein the cultivation object is a dicotyledon, and the microwave is radiated after a first true leaf is formed.

4. The method for cultivating the plant according to claim 3, wherein the microwave is radiated at a timing at which a second true leaf is formed.

5. The method for cultivating the plant according to claim 1, wherein the cultivation object is a monocotyledon, and the microwave is radiated after a first true leaf extends from a coleoptile.

6. The method for cultivating the plant according to claim 1, wherein when the cultivation object is cultivated from a bulb, then the microwave is radiated after performing sprouting, and then planting is performed.

7. The method for cultivating the plant according to claim 1, wherein the microwave is radiated, while an output of the microwave is not more than 50 W.

8. A method for producing a plant seedling based on microwave radiation, comprising starting the microwave radiation during a period ranging from appearance of a first true leaf to a timing provided before appearance of a second true leaf in a growth process of a plant without radiating the microwave during a period ranging from a seed the appearance of the first true leaf.

9. The method for producing the plant seedling according to claim 8, wherein a radiation time of the microwave is not more than 60 minutes.

10. The method for producing the plant seedling according to claim 8, wherein the microwave is radiated after the first true leaf develops.

11. The method for producing the plant seedling according to claim 8, wherein the plant is a dicotyledon.

12. The method for producing the plant seedling according to claim 11, wherein the dicotyledon is selected from the group consisting of *Arabidopsis thaliana, Eruca vesicaria*, and *Solanum lycopersicum*.

13. The method for producing the plant seedling according to claim 8, wherein an output of the microwave is 2 to 25 W per 1 to 20 seedling or seedlings.

14. A method for growing a plant, comprising growing the seedling produced by the method for producing the plant seedling as defined in claim 8 until the plant seedling arrives at least at a reproductive stage.

15. A plant seedling obtained by radiating a microwave, wherein microwave radiation is started during a period ranging from appearance of a first true leaf to a timing provided before appearance of a second true leaf in a growth process of a plant without radiating the microwave during a period ranging from a seed the appearance of the first true leaf.

* * * * *